Patented Sept. 2, 1930

1,774,802

UNITED STATES PATENT OFFICE

JOHN C. MacLACHLAN, OF CHICAGO, ILLINOIS

MOLASSES AND CEREAL PRODUCT AND PROCESS FOR MAKING

No Drawing.  Application filed December 22, 1928. Serial No. 328,055.

This invention relates to a certain molasses product and the process or method of producing the same. Molasses is now used as a constituent of many manufactured products, among which may be mentioned stock foods, chewing tobacco and orchard sprays. Molasses is also used in molders' sand in making castings. One form of this molasses is commonly known as "black strap". It is desirable for the purposes of mixing, handling and transportation, to have the molasses in dry and powdered form.

It is an object of this invention, therefore, to provide a novel molasses product and process of producing the same.

It is another object of the invention to provide a product consisting of dried molasses, a dried cooked cereal and preferably some mineral product.

It is also an object of the invention to provide a novel process of producing such a product as set forth in the preceding paragraph, which consists in cooking a ground vegetable such as flour to make a paste and mixing this paste with the molasses and other constituents and then drying the same substantially instantaneously by projecting the same in finely disintegrated condition in a blast of hot air.

These and other objects and advantages of the invention will be fully set forth in the following description.

It has been found that dried molasses is somewhat hygroscopic. It has also been found that when the liquid molasses is mixed with the ground vegetable or cereal, the latter being in dry form, the molasses is thickened and this adds to the difficulty of handling the same in the drying step. The applicant has discovered that by taking a ground cereal or vegetable, such as a low grade of flour and cooking the same with water to form a paste, that the same can then be mixed with the molasses without thickening the molasses and the mixture is dried with comparative ease and the cooked flour or other cereal or vegetable form a very effective stabilizer eliminating the hygroscopic quality of the dried product. The nature of the cereal or flour is changed in the cooking process and a starchy paste results.

In accordance with the present method, therefore, the molasses is mixed with a product formed by cooking a ground cereal or vegetable to form a paste which is in liquid or semi-liquid form. In order to have a commercial product for stock food uses, the stabilizer used must be obtainable at a low price. It has been found that a low grade wheat flour can be obtained at a price which readily permits its use with the molasses to form a stock food. The black strap molasses can usually be obtained at about three cents a pound and the flour at about two cents a pound so that a mixture of the two would average less than three cents a pound. Other vegetable and cereal products which readily lend themselves to a similar use as a stabilizer are barley flour, rice flour or the meal or product formed by hulling or scouring the rice. It has also been found desirable to mix some mineral substance in the product and such minerals as lime, charcoal and carbon in the form of soot have been used. Such minerals make good fillers and are desirable as ingredients in a stock food. Usually from 15% to 25% of the ground vegetable or cereal is used, this percentage being taken of the dried cereal before the same is mixed with water and cooked. From 5% to 10% of the mineral product is usually added. After the molasses has been mixed with the paste formed by the ground material and the mineral ingredient has been mixed therein the same is then dried in any of the well known forms of drying apparatus. A drying apparatus such as shown in any of the following patents granted to the applicant is very suitable: No. 1,594,065, issued July 27, 1926; No. 1,546,987, issued July 21, 1925; No. 1,468,118, issued Sept. 18, 1923.

All of these patents disclose an apparatus comprising a distributing head of the centrifugal type for distributing the material in an umbrella-like shower. The material is disintegrated either by mechanical beaters or by blasts of steam. The same is projected centrifugally in said shower in a drying cabinet into and through which heated air is passed, the material falling to the bottom of the cabinet in the form of dry powder. When the mixture has been dried in such an apparatus a very fine dry powdered material results and one which is non-hygroscopic in character. This material can be easily transported and readily mixed with other material to form the stock food now commercially marketed. The dry product can also be made with a very small percentage of mineral, or without the mineral ingredient and the same can then be used for other products than stock food which now include molasses as an ingredient.

From the above description it is seen that applicant has provided a very novel and useful process and product. A molasses product is formed which is very desirable as an ingredient in stock food and which has the desirable qualities rendering the same efficient in handling and transportation. The product and method of making the same have been amply demonstrated in actual practice and found to be very successful and efficient.

It will, of course, be understood that various changes may be made in the ingredients and the proportions of the ingredients and in the steps and sequence of steps of the method without departing from the scope of applicant's invention, which generally stated, consists in a method and product capable of carrying out the objects above set forth, such as disclosed and defined in the appended claims.

What is claimed is:—

1. A composition of matter consisting of an intimate mixture of the dehydrated components of a major percentage of molasses with a minor percentage of a stabilizer comprising a cooked ground vegetable product, said composition being non-hygroscopic and having the character of a dry powder.

2. A composition of matter consisting of an intimate mixture of the dehydrated components of a major percentage of black strap molasses with a minor percentage of cooked flour and water, the composition being non-hygroscopic and having the character of a dry powder.

3. The process of producing a dried molasses product which consists in cooking a ground vegetable material with water, mixing molasses with a lesser quantity of said cooked material and disintegrating and projecting said mixture in a heated gaseous medium to rapidly dry the same and form a dry powdered material.

4. The process of producing a dried molasses product which consists in cooking a ground vegetable material with water, mixing molasses with a much lesser quantity of said cooked material and adding to the mixture a finely ground filling material and then disintegrating and drying said mixture by projecting the same in a heated gaseous medium to reduce the same to the form of a dried powdered material.

5. A composition of matter consisting of an intimate mixture of the dehydrated components of a large percentage of molasses with minor percentages of a stabilizer comprising a cooked ground vegetable product and a finely ground filler material, said composition being non-hygroscopic and having the character of a dry powder.

In testimony whereof I affix my signature.

JOHN C. MacLACHLAN.